United States Patent [19]

Bleidorn et al.

[11] Patent Number: 4,718,078
[45] Date of Patent: Jan. 5, 1988

[54] SYSTEM FOR CONTROLLING MOTION OF A ROBOT

[75] Inventors: Werner-Wilhelm Bleidorn, Erlangen; Norbert Krause, Bubenreuth, both of Fed. Rep. of Germany

[73] Assignee: Siemens Aktiengesellschaft, Munich, Fed. Rep. of Germany

[21] Appl. No.: 888,975

[22] Filed: Jul. 23, 1986

[30] Foreign Application Priority Data

Aug. 19, 1985 [DE] Fed. Rep. of Germany ....... 3529609

[51] Int. Cl.$^4$ ............................................. G05B 19/42
[52] U.S. Cl. ..................................... 318/568; 364/513; 318/563
[58] Field of Search .................. 318/568, 568 M, 565, 318/563; 364/513; 901/9

[56] References Cited

U.S. PATENT DOCUMENTS

| | | |
|---|---|---|
| 3,920,972 | 11/1975 | Corwin, Jr. et al. . |
| 4,205,308 | 5/1980 | Haley et al. . |
| 4,305,028 | 12/1981 | Kostas ................................ 318/565 |
| 4,409,650 | 10/1983 | Noguchi . |
| 4,529,921 | 7/1985 | Moribe . |
| 4,591,990 | 5/1986 | Nozawa et al. ................. 318/568 X |
| 4,594,671 | 6/1986 | Sugimoto et al. .............. 318/568 M |
| 4,603,284 | 7/1986 | Perzley ........................... 318/568 M |
| 4,604,716 | 8/1986 | Kato et al. ...................... 318/568 M |
| 4,617,502 | 10/1986 | Sakaue et al. ........................ 318/568 |

FOREIGN PATENT DOCUMENTS 67877 12/1982 European Pat. Off. .
130570 1/1985 European Pat. Off. .

OTHER PUBLICATIONS

Horst Becker and Peter Muller, "Robot Control M, ein neues Steuerungskonzept fur Handhabungssysteme", Siemens-Energietechnik, No. 3, 1981, vol. 8-9, pp. 285-289.

Primary Examiner—Benjamin Dobeck
Attorney, Agent, or Firm—Kenyon & Kenyon

[57] ABSTRACT

In a system for controlling the motion of an industrial robot, a resultant translational velocity of a preselected point on the robot is calculated from a plurality of velocity values such as actual velocity values detected by sensors or target velocity values computed from a velocity reference value. Upon the exceeding of a predetermined maximum velocity by the calculated resultant velocity, all robot motion is terminated. Robot motion may also be stopped upon detecting an excessive difference between an actual angular velocity of one robot component and a respective desired or target angular velocity of that robot component, upon detecting an excessive translational acceleration of a predetermined point on the robot, or upon detecting a position of the robot part or point located more than a predetermined distance from a reference position.

17 Claims, 1 Drawing Figure

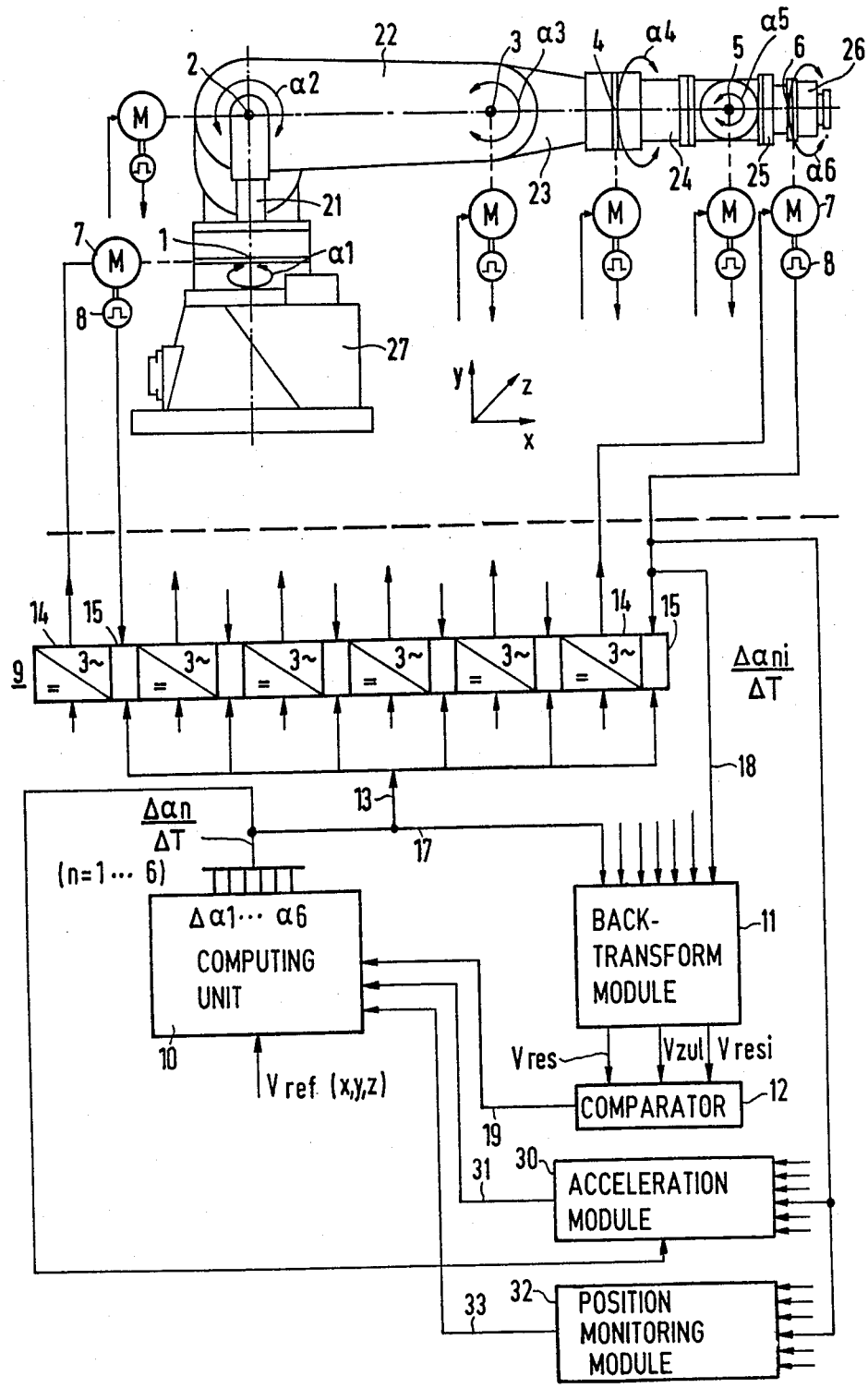

SYSTEM FOR CONTROLLING MOTION OF A ROBOT

BACKGROUND OF THE INVENTION

This invention relates to a system for controlling the motion of a robot. More particularly, this invention relates to such a motion control system which includes a velocity monitoring device.

Motion control systems for industrial robots are known wherein a control unit transforms a velocity reference value, defined with respect to fixed spacial coordinates, into command signals corresponding to respective axes of rotation of individual axis drives of the industrial robot. In such motion control systems, means are generally provided to shut down the drives in the event that maximum motion velocities of the robot are exceeded.

In industrial robots, especially in programming or testing work in the working range, it is necessary to ensure that velocities of the various robot parts do not exceed 25 cm per second. This limitation on velocity is possibly exceeded not only owing to the provision of excessive reference velocity values but also owing to disturbances or miscalculations in the control unit.

In known motion control systems for industrial robots, the limitation of velocities within acceptable ranges is accomplished either by inching at reduced power levels and/or by monitoring the velocities of individual drives about respective axes of rotation. A disadvantage of the second mode of implementation is that the resulting velocity of a free end of the robot may become excessively high although the angular velocities of individual robot parts about respective axes of rotation are kept within acceptable limits or ranges.

An object of the present invention is to provide an improved robot motion control system of the above-described type.

Another object of the present invention is to provide such an improved motion control system wherein the exceeding of a predetermined maximum translational velocity is prevented.

SUMMARY OF THE INVENTION

The present invention is directed to a system for controlling the motion of a robot having a multiplicity of parts connected to each other for rotation relative to each other about respective axes of rotation. In accordance with the invention, the motion control system comprises a drive assembly operatively connected to the robot parts for rotating the same about respective axes of rotation, a converter operatively coupled to the drive assembly for transforming a velocity reference value defined in terms of fixed spacial coordinates into command signals transmitted to the drive assembly for modifying angular velocities of the robot parts about the rotation axes so that an actual velocity of a point on the robot approaches the velocity reference value. The motion control system further comprises a velocity monitor operatively connected to the drive assembly for terminating operation thereof upon detecting an impermissibly high motion parameter. The velocity monitor includes means operatively connected to at least either the converter or the drive assemblies for calculating from a plurality of velocity values a resultant velocity and for comparing the resultant velocity with a predetermined maximum value. The resultant velocity is preferably defined with respect to the fixed spacial coordinates, e.g., a Cartesian coordinate system.

In accordance with a particular feature of the present invention, the velocity values used to calculate the resultant velocity constitute desired or target angular velocities of the respective the robot parts about respective rotation axes. The target angular velocities are derived by the converter from the velocity reference value and may be coded in the command signals transmitted from the converter to the drive assembly.

In accordance with an alternative particular feature of the present invention, the velocity values used to calculate the resultant velocity constitute actual angular velocities of the respective robot parts about the axes of rotation. The velocity monitor advantageously includes at least one sensor operatively coupled to the drive assembly for detecting the actual angular velocities.

Pursuant to another particular feature of the present invention, the velocity monitor receives signals coding the actual angular velocities detected by the sensor or sensors, as well as further signals coding the target angular velocities generated by the converter. The velocity monitor includes a comparator for comparing the actual angular velocities with respective target angular velocities and for generating an alarm signal upon detecting a difference greater than a pre-established magnitude.

Pursuant to yet another particular feature of the present invention, the motion control system further comprises an acceleration monitor operatively connected to the drive assembly for terminating operation thereof upon detecting an acceleration of a point on one of the robot parts greater than a predetermined maximum value. The acceleration monitor may calculate a resultant acceleration solely from actual angular velocities received from the sensor or sensors or, alternatively, from both the actual angular velocities and from the target angular velocities generated by the converter.

In accordance with a specific feature of the invention, the motion control system further comprises a position monitor operatively connected to the drive assembly for terminating operation thereof upon detecting a location or travel distance of one of the parts greater than a predetermined distance from a reference position.

The present invention is also directed to a method for controlling the motion of a robot having a multiplicity of parts connected to each other for rotation relative to each other about respective axes of rotation, the robot being provided with a drive assembly operatively coupled to the robot parts for rotating the parts about respective axes of rotation. In accordance with the invention, the method comprises the steps of (a) transforming a velocity reference value defined in terms of fixed spacial coordinates into command signals for modifying angular velocities of the robot parts about the respective axes of rotation so that an actual velocity of a point on the robot (e.g., a point at a tip or free end of the robot) approaches or attains the velocity reference value, (b) transmitting the command signals to the drive assembly and (c) operating the drive assembly in accordance with the command signals to modify the angular velocities of the robot parts about the respective axes of rotation. In further steps (d) and (e), velocity values associated with the robot parts are monitored and a resultant velocity is calculated from a plurality of the monitored velocity values, the resultant velocity being compared with a predetermined maximum value. In a final step (f), the drive assembly is stopped upon the exceeding of the predetermined maximum value by the resultant velocity.

The velocity monitor in accordance with the present invention functions in part as a "back-transformation" module which receives velocity reference values (i.e., the target angular velocities) calculated by the converter unit and/or actual angular velocities of various robot parts. Translational velocities with respect to a fixed spacial coordinate system are calculated by the velocity monitor and compared with permissible motion velocities. Pursuant to the back transformation performed in accordance with the present invention, any part of the robot, for example, the tip thereof, is monitored to determine whether that robot part is exceeding a predetermined maximum translational velocity.

BRIEF DESCRIPTION OF THE DRAWING

The sole FIGURE of the drawing is a schematic side elevational view of a robot and a block diagram of a motion control system connected to drive motors of the robot, in accordance with the present invention.

DETAILED DESCRIPTION

The drawing shows a robot assembly comprising a multiplicity of robot parts 21-26 pivotably connected to a base 27 at a rotary joint 1 and pivotably connected to one another at rotary joints 2-6. Robot part 21 is capable of rotation through an angle $\alpha 1$ about a vertical axis 28, while part 22 is rotatable through an angle $\alpha 2$ about an axis extending horizontally through joint 2. Similarly, robot part 23 is rotatable through an angle $\alpha 3$ relative to part 22 about a horizontal axis extending through joint 3. Robot part 24 is pivotable through an angle $\alpha 4$ about an axis extending through joint 4, whereas robot part 25 is pivotable through an angle $\alpha 5$ relative to part 24 about another axis extending through joint 5. Robot part 26 is rotatable through an angle $\alpha 6$ about an axis extending through joint 6.

A motion control system in accordance with the invention includes a plurality of drive motors 7 operatively connected to respective parts 21-26 for rotating those parts relative to one another about the respective axes of rotation. The drives may be integrated into the robot joints and are supplied with respective energizing voltages generated by a voltage source 9 comprising a multiplicity of inverters 14 each operatively connected to a respective control unit 15.

To each control unit 15 is fed a signal coding a desired or target velocity in the form of a respective desired or target angle change $\Delta \alpha n$ per clock unit $\Delta T$. The target angular velocities are generated and transmitted via a bus system 13 to control units 15 by a converter or computer unit 10 which transforms a velocity reference value $Vref(x,y,z)$. Velocity reference value $Vref(x,y,z)$ represents a desired velocity vector in Cartesian space of an arbitrary point on the robot assembly, preferably a point spaced from part 21, and most preferably a point at the tip or free end of robot part 26. Converter 10 computes from velocity reference value $Vref(x,y,z)$ via a coordinate transformation the target velocity values $\Delta \alpha n/\Delta T$ (n=1, 2, . . . 6) which specify the desired angular velocities of parts 21-26 about joints 1-6.

From the target angular velocities received from converter 10 and from signals coding actual angular velocities of parts 21-26 with respect to each other at joints 1-6, the actual angular velocity signals being produced by actual value transmitters or sensors 8, control units 15 generate respective control commands for inverters 14. The control commands result in a modification of the angular velocities of parts 21-26 with respect to each other so that an actual velocity of the selected point on the robot assembly approaches the velocity reference value $Vref(x,y,z)$.

A motion control system of the above described type is known exemplarily from the journal *Siemens-Energietechnik*, 1981, pages 285-289, and from *German Auslegeschrift No. 25 26 504*.

In accordance with the present invention, a system for controlling the motion of robot parts 21-26 with respect to each other includes a back-transformation module 11 having an input operatively connected via a lead 17 to converter 10 for receiving therefrom the signals coding target angular velocities $\Delta \alpha n/\Delta T$. Back-transformation module 11 has further inputs connected via leads 18 to transmitters or sensors 8 for receiving therefrom signals coding the actual angular velocities $\Delta \alpha ni/\Delta T$ of robot parts 21-26 with respect to each other.

Back-transformation module 11 calculates from the target angular velocities or from the actual angular velocities a resultant velocity Vres of the selected point on the robot assembly, most preferably a point at the tip or free end of robot part 26. Resultant velocity Vres is transmitted to a comparator module 12 for comparison with a predetermined maximum value Vmax such as 25 cm per second. If comparator 12 determines that maximum permissible value Vmax has been exceeded, a stop or alarm signal is generated and transmitted to converter unit 10 via a lead 19. The appearance of this alarm signal causes an immediate shutdown of all drive motors 7. In this way, errors can be recognized which have occurred within robot control or converter 10 which errors would lead to impermissibly high velocity values.

Resultant velocity Vres can be calculated either from the target angular velocities calculated by converter unit 10 or from a combination of those target velocities and the actual angular velocities detected by sensors 8. In addition, back-transformation module 11 and comparator module 12 can cofunction to compare the actual angular velocities with the respective target angular velocitiess and to generate an alarm signal on lead 19 whenever the difference between an actual angular velocity and the respective target angular velocity is greater than a pre-established magnitude. Moreover, an alarm or trouble signal can be transmitted to converter or control 10 in the event of deviations between both values which deviations are caused exemplarily by malfunctions of transmitters 8.

As illustrated in the drawing, an acceleration monitoring module 30 may be connected to sensors 8 for receiving therefrom the signals coding the actual angular velocities of robot parts 21-26. Acceleration monitoring module 30 calculates from the received actual angular velocities an actual translational acceleration (defined with respect to the Cartesian coordinate system) of a preselected point on the robot, e.g., a point at the tip of robot part 26. Upon detecting an acceleration greater than a preselected maximum, acceleration monitoring module generates an alarm signal on a lead 31 extending to converter or computing unit 10 for inducing that unit to generate motion termination signals on multiple 13. Alternatively, acceleration monitoring module 30 may generate an alarm signal in response to detecting an excessive difference between a predetermined maximum acceleration value and an acceleration calculated from the actual angular velocities and from the target angular velocities generated by computing unit 10.

Motion control of the component parts 21–26 of the robot may be implemented, in addition, by means of a position monitoring module 32 operatively connected at an input to sensors 8 and at an output to computing unit 10 via a lead 33 for terminating operation of the robot upon detecting a location of one of the robot parts 21–26 greater than a predetermined distance from a respective reference position.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proferred by way of example to facilitate comprehension of the invention and should not be construed to limit the scope thereof.

What is claimed is:

1. A system for controlling the motion of a robot having a multiplicity of parts connected to each other for rotation relative to each other about respective axes of rotation, said system comprising:
    drive means operatively connected to said parts for rotating same about respective ones of said axes;
    converter means operatively coupled to said drive means for transforming a velocity reference value defined in terms of fixed spatial coordinates into command signals transmitted to said drive means for modifying angular velocities of said parts about said axes so that an actual velocity of a point on said robot approaches said velocity reference value; and
    velocity monitoring means operatively connected to said drive means for terminating operation of said drive means upon detecting an impermissibly high motion parameter, said velocity monitoring means including means operatively connected to at least one of said converter means and said drive means for calculating from a plurality of velocity values a resultant vectorial velocity defined with respect to said fixed spatial coordinates and for comparing said resultant vectorial velocity with a predetermined maximum value.

2. The system defined in claim 1 wherein said velocity values constitute target angular velocities of respective ones of said parts about respective ones of said axes, said target angular velocities being derived by said converter means from said velocity reference value.

3. The system defined in claim 2 wherein said velocity monitoring means includes sensor means operatively coupled to said drive means for detecting actual angular velocities, said velocity monitoring means further including comparator means for comparing said actual angular velocities with respective ones of said target angular velocities and for generating an alarm signal upon detecting a difference greater than a pre-established magnitude.

4. The system defined in claim 2 wherein said velocity values constitute actual angular velocities of respective ones of said parts about respective ones of said axes, said velocity monitoring means including sensor means operatively coupled to said drive means for detecting said actual angular velocities.

5. The system defined in claim 4, wherein said velocity monitoring means includes comparator means for comparing said actual angular velocities with, respective target angular velocities derived by said converter means from said velocity reference value and for generating an alarm signal upon detecting a difference greater than a pre-established magnitude.

6. The system defined in claim 1, further comprising acceleration monitoring means operatively connected to said drive means for terminating operation thereof upon detecting an acceleration of a point on one of said parts greater than an additional predetermined maximum value.

7. The system defined in claim 6 wherein said velocity monitoring means includes sensor means operatively coupled to said drive means for detecting actual angular velocities of said parts about respective ones of said axes, said acceleration monitoring means being operatively coupled to said sensor means for receiving therefrom signals coding said actual angular velocities, said acceleration monitoring means including means for calculating a resultant acceleration from said actual angular velocities and for comparing said resultant acceleration with said additional predetermined maximum value.

8. The system defined in claim 6 wherein said velocity monitoring means includes sensor means operatively coupled to said drive means for detecting actual angular velocities of said parts about respective ones of said axes, said acceleration monitoring means being operatively coupled to said sensor means for receiving therefrom signals coding said actual angular velocities, said acceleration monitoring means being operatively coupled to said converter means for receiving therefrom signals coding target angular velocities of respective ones of said parts about respective ones of said axes, for calculating a resultant acceleration from said actual angular velocites and said target angular velocites and for comparing said resultant acceleration with said additional predetermined maximum value, said target angular velocities being derived by said converter means from said velocity reference value.

9. The system defined in claim 1, further comprising position monitoring means operatively connected to said drive means for terminating operation thereof upon detecting a location of one of said parts greater than a predetermined distance from a reference position.

10. In a system for controlling the motion of a robot having a multiplicity of parts connected to each other for rotation relative to each other about respective axes of rotation, said system including drive means operatively connected to said parts for rotating same about respective ones of said axes, said system further including converter means for transforming a velocity reference value defined in terms of fixed spatial coordinates into command signals transmitted to said drive means for modifying angular velocities of said parts about said axes so that an actual velocity of a point on said robot approaches said velocity reference value, said system further including velocity monitoring means operatively connected to said drive means for terminating operation of said drive means upon detecting an impermissibly high motion parameter,
    the improvement wherein said velocity monitoring means includes means operatively connected to at least one of said converter means and said drive means for calculating from a plurality of velocity values a resultant vectorial velocity defined with respect to said fixed spatial coordinates and for comparing said resultant vectorial velocity with a predetermined maximum value.

11. A method for controlling the motion of a robot having a multiplicity of parts connected to each other for rotation relative to each other about respective axes of rotation, said robot being provided with drive means operatively coupled to said parts for rotating same about respective ones of said axes, said method comprising the steps of:

transforming a velocity reference value defined in terms of fixed spatial coordinates into command signals for modifying angular velocities of said parts about said axes so that an actual velocity of a point on said robot approaches said velocity reference value;

transmitting said command signals to said drive means;

operating said drive means in accordance with said command signals to modify the angular velocities of said parts about respective ones of said axes;

monitoring velocity values associated with said parts;

calculating from a plurality of said velocity values a resultant vectorial velocity defined with respect to said fixed spatial coordinates and comparing said resultant vectorial velocity with a predetermined maximum value; and terminating operation of said drive means upon detecting an exceeding of said predetermined maximum value by said resultant vectorial velocity.

12. The method defined in claim 11 wherein said command signals code target angular velocities of said parts about said axes and wherein said velocity values constitute respective ones of said target angular velocities.

13. The method defined in claim 14 wherein said step of monitoring includes the step of detecting actual angular velocities of said parts about said axes, said step of monitoring further including the step of comparing said actual angular velocities with respective ones of said target angular velocities and of generating an alarm signal upon detecting a difference greater than a pre-established magnitude.

14. The method defined in claim 11 wherein said velocity values constitute actual angular velocities of respective ones of said parts about respective ones of said axes, further comprising the step of detecting said actual angular velocities.

15. The method defined in claim 14 wherein said command signals code target angular velocities of said parts about said axes, said steps of monitoring including the step of comparing said actual angular velocities with respective target angular velocities and of generating an alarm signal upon detecting a difference greater than a pre-established magnitude.

16. The method defined in claim 11, further comprising the steps of monitoring acceleration of at least one of said parts and of terminating motion of the robot upon detecting an acceleration of said one of said parts greater than an additional predetermined maximum value.

17. The method defined in claim 11, further comprising position monitoring means operatively connected to said drive means for terminating operation thereof upon detecting a location of one of said parts greater than a predetermined distance from a reference position.

* * * * *